Aug. 25, 1925.

A. S. FITZ GERALD

PROTECTIVE SYSTEM

Filed Nov. 29, 1924

1,551,380

Inventor:
Alan Stewart FitzGerald;
by
His Attorney.

Patented Aug. 25, 1925.

1,551,380

UNITED STATES PATENT OFFICE.

ALAN STEWART FITZ GERALD, OF SCHENECTADY, NEW YORK, ASSIGNOR TO GENERAL ELECTRIC COMPANY, A CORPORATION OF NEW YORK.

PROTECTIVE SYSTEM.

Application filed November 29, 1924. Serial No. 752,991.

*To all whom it may concern:*

Be it known that I, ALAN STEWART FITZ GERALD, a subject of the British Empire, residing at Schenectady, in the county of Schenectady, State of New York, have invented certain new and useful Improvements in Protective Systems, of which the following is a specification.

My invention relates to improvements in protective systems and more particularly to improvements in circulating current protective systems for alternating current feeders, interconnectors, machines or other apparatus, whether single phase or polyphase (hereinafter designated generally by the term circuit) of the type wherein the protected circuit is provided with current transformers, the secondary windings of which give substantially the same output and are connected for circulating current. My invention further relates particularly to such systems of protection in which the current transformers connected in the circulating current circuit are relatively far apart, as is often the case in the protection of feeders, and the impedance in the relatively long pilot conductors used causes an appreciable potential drop.

An object of my invention is to provide an improved circulating current protective system in which the disturbing effects due to the impedance of the pilot circuit are eliminated and in which the disturbing effects due to differences between current transformer characteristics, accentuated particularly on through fault conditions, are minimized.

My invention will be better understood from the following description taken in connection with the accompanying drawing, and its scope will be pointed out in the appended claims.

Figure 1:
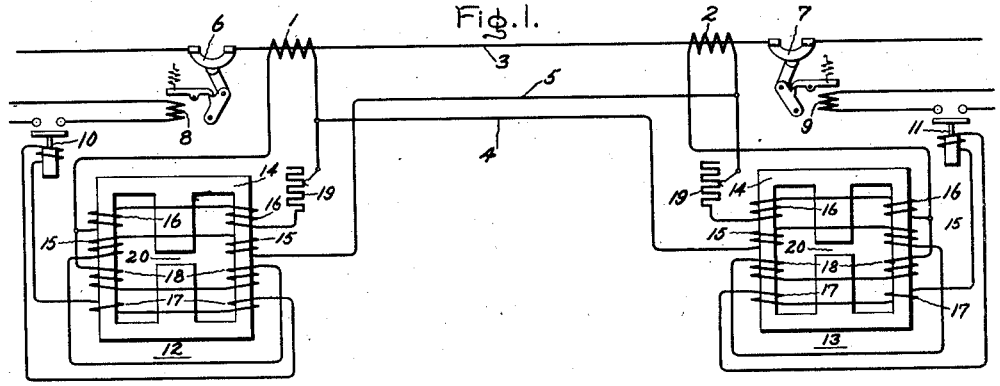
Figure 2:
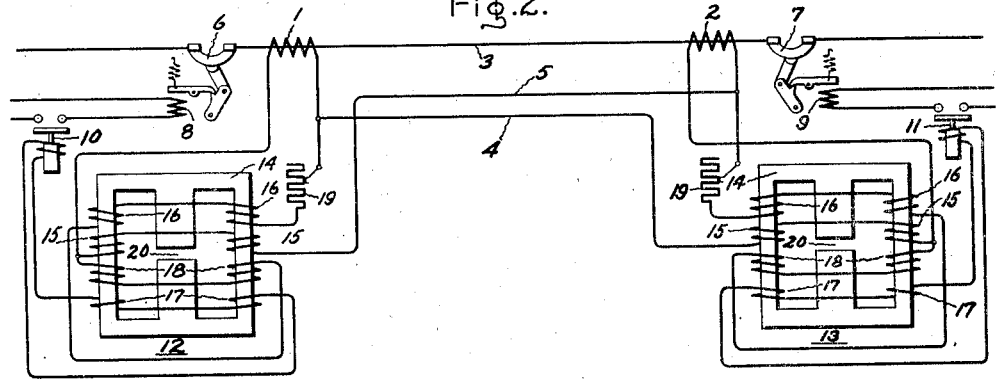
Figure 3:
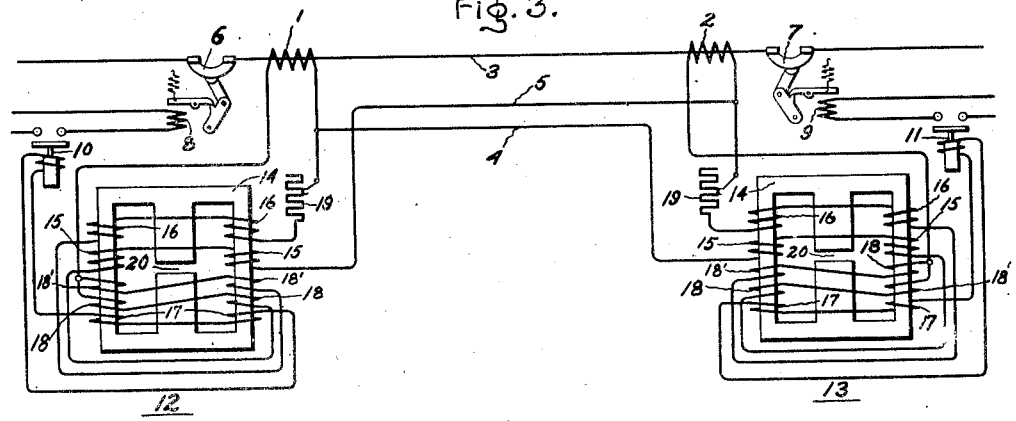

In the accompanying drawing, Fig. 1 illustrates diagrammatically in a single line drawing for the sake of clearness one embodiment of my invention and Figs. 2 and 3 illustrate diagrammatically modifications of my invention.

In the several figures of the drawing, current transformers 1 and 2, located at more or less widely separated points on an alternating current circuit, such as a feeder conductor 3, have their secondary windings connected in series for circulating current through pilot conductors 4 and 5. A section of the conductor 3 is arranged to be controlled by suitable circuit interrupting means 6 and 7 which are controlled through trip coils 8 and 9 by relays 10 and 11.

In accordance with my invention, there are associated with the current transformers 1 and 2, auxiliary or biasing transformers 12 and 13 which are in general similar to those disclosed in my Letters Patent, 1,468,441 of the United States for protective device for electric distribution systems, issued September 18, 1923 and assigned to the same assignee as this invention and my copending application Serial No. 652,276 for alternating electric current protective apparatus, filed July 18, 1923 and assigned to the same assignee as this invention. For the purpose of this specification, however, a biasing transformer is defined as a transformer having a primary or operating winding connected to receive operating current, a secondary winding inductively related to the primary winding and a restraining winding so disposed as to produce substantially no electromotive force at the terminals of the primary and secondary windings but adapted to be energized to regulate the flux set up by the primary winding in response to given circuit conditions.

For the purpose of this specification, the pilot or circulating current circuit is defined as the circuit including the secondary windings of the current transformers 1 and 2 and the pilot wires 4 and 5.

In carrying out my present invention, the core 14 of the biasing transformer is provided with two primary windings 15 and 16 which are inductively related to a secondary winding 17 in the circuit of which the energizing windings of the relays 10 or 11 are connected. The biasing transformer further comprises means for diminishing the effect on the primary windings 15 and 16 due to differences between the characteristics of the current transformers 1 and 2, such as a restraining winding 18 connected to be energized in accordance with the current flowing through the section of the feeder between the current transformers 1 and 2; for example, in the pilot circuit as shown in Fig. 1 or in the circuit across the secondary winding of the associated current transformer as shown in Fig. 2, or a divided restraining winding comprising a portion 18 connected in the pilot circuit and a portion 18' connected in the circuit across the secondary winding of the associated current transformer as shown in Fig. 3. The restraining winding is so disposed as to produce substantially no electromotive force at the terminals of the primary and secondary windings 15, 16 and 17, but is adapted to regulate the fluxes produced by the primary windings 15 and 16 in accordance with the current in the pilot circuit as in Fig. 1, or in the circuit across the secondary winding of the associated current transformer as in Fig. 2 or with the currents in both the pilot circuit and the current transformer shunt circuit as in Fig. 3, the portions 18, 18' of the restraining winding in the last case being arranged to act cumulatively. The primary windings 15 and 16 are so connected and arranged as normally to produce opposing magnetomotive forces, one winding 15 being connected in the pilot circuit and the other winding 16 across the secondary winding of the associated current transformer and in circuit with means for compensating for the potential drop in the pilot circuit conductors 4 and 5 such as an impedance 19 in series with the winding 16 so proportioned relatively to the impedance of the pilot circuit and the ratio of the turns in the primary windings 15 and 16 that the flux due thereto normally is substantially zero. The impedance 19 may be either fixed or adjustable and may be made equal to the impedance of one of the pilot conductors 4, 5.

Referring now to Fig. 1 and assuming for the sake of simplicity that the ratio of the turns in the primary windings 15 and 16 is unity and that the value of the impedance 19 is equivalent to the impedance of one of the pilot conductors 4 and 5, then under normal conditions the current output of the secondary winding of each of the current transformers 1 and 2 divides substantially equally in the pilot circuit and in the circuit across the current transformer secondary winding. In other words, both of the primary windings 15 and 16 are energized by currents of substantially equal value and as these windings are arranged for opposing magnetomotive forces, their resultant flux is substantially zero. Also, under normal conditions, there will be no appreciable unbalancing effect due to differences between the characteristics of the current transformers 1 and 2, and consequently no restraining effect will then be required from the restraining winding 18. For this reason, in order to obtain the utmost sensitivity from the arrangement, I preferably provide a reluctance or an equivalent arrangement in the magnetic circuit of the flux due to the restraining winding, such as an air gap 20, as is described in the aforesaid patent and copending application.

Upon the occurrence, however, of a heavy through fault on the system comprising the feeder 3, such as a short circuit outside of the section between the circuit interrupters 6 and 7, in the event of which it is desirable for minimum interruption of service that this section be not opened, an appreciable amount of out-of-balance current may flow in the primary windings 15 and 16 due to differences between the characteristics of the current transformers 1 and 2. Owing to the impedance 19 included in the circuit of the primary winding 16, the effect of the potential drop due to the impedance of the pilot wires 4 and 5 will still be compensated. A considerably greater current now flows in the restraining winding 18 and accordingly the restraining effect of this winding is now present. Consequently, if an out-of-balance current should appear in either of the primary windings 15, 16 the effect of the restraining winding 18 is sufficient to prevent the operation of the relays 10 and 11. Upon the occurrence of a fault on the feeder 3 in the section between the current transformers 1 and 2, an out-of-balance current proportional to the difference between the two currents flowing in the primary windings of the current transformers 1 and 2 will appear in the primary windings 15 and 16, and their magnetomotive forces will no longer be equal. Consequently, there will be induced in the secondary winding 17 a current sufficient to operate the relays 10 and 11 in spite of any restraining effect from the restraining winding 18.

From the foregoing, it is believed that the operation of the modifications shown in Figs. 2 and 3 will be obvious.

Although I have shown and described my invention in considerable detail, I do not wish to be limited to the specific details thereof as shown and described, but may use such modifications, substitutions, or equivalents thereof as are embraced within the spirit of my invention.

What I claim as new and desire to secure by Letters Patent of the United States is:—

1. In a protective system for an alternating current circuit wherein the secondary windings of a plurality of current transformers are connected in a pilot circuit normally to produce a circulating current, the combination of a biasing transformer and means for compensating for the impedance of the pilot circuit.

2. In a protective system for an alternating current circuit wherein the secondary windings of a plurality of current transformers are connected in a pilot circuit normally to produce a circulating current, an auxiliary transformer comprising a plurality of primary windings, one connected in the pilot circuit and another across the secondary winding of one of the current transformers, said primary windings being arranged normally to produce opposing magnetomotive forces, and means for compensating for the potential drop in the pilot circuit conductors comprising an impedance in circuit with said other primary winding so proportioned relatively to the impedance of the pilot circuit conductors and the ratio of the turns in said primary windings that the flux due thereto normally is substantially zero.

3. In a protective system for an alternating current circuit wherein two current transformers in series relation with a conductor of the circuit at separate points thereof have their secondary windings connected in a pilot circuit normally to produce a circulating current, a plurality of auxiliary transformers respectively associated with said current transformers each comprising two primary windings one connected in series in the pilot circuit and the other across the secondary winding of the associated current transformer, said primary windings being arranged normally to produce opposing magnetomotive forces, and means for compensating for the potential drop in the pilot circuit conductors comprising an impedance connected in series with said other primary winding and so proportioned relatively to the impedance of one of the pilot circuit conductors and the ratio of the turns in said primary windings that the flux due thereto normally is substantially zero.

4. In a protective system for an alternating current circuit wherein the secondary windings of a plurality of current transformers are connected in a pilot circuit normally to produce a circulating current, a biasing transformer comprising a plurality of primary windings, one connected in the pilot circuit and another across the secondary winding of one of the current transformers, said primary windings being arranged normally to produce opposing magnetomotive forces, and means for diminishing the effect caused by differences between the characteristics of the current transformers comprising a restraining winding connected to be energized in accordance with the current through the section of said circuit between said current transformers and so disposed as to produce substantially no electromotive force at the terminals of said primary windings but adapted to regulate the fluxes produced thereby, and means for compensating for the potential drop in the pilot circuit comprising an impedance in circuit with said other primary winding so proportioned relatively to the impedance of the pilot circuit and the ratio of the turns in said primary windings that the flux due thereto normally is substantially zero.

5. In a protective system for an alternating current circuit wherein two current transformers in series relation with a conductor of the circuit at separate points thereof have their secondary windings connected in a pilot circuit normally to produce a circulating current, a plurality of biasing transformers respectively associated with said current transformers each comprising two primary windings, one connected in series in the pilot circuit and the other across the secondary winding of the associated current transformer, said primary windings being arranged normally to produce opposing magnetomotive forces, and means for diminishing the effect caused by differences between the characteristics of the current transformers comprising a restraining winding connected in series in the pilot circuit and so disposed as to produce substantially no electromotive force at the terminals of said primary windings but adapted to regulate the fluxes produced thereby in accordance with the current in the pilot circuit, and means for compensating for the potential drop in the pilot circuit conductors comprising an impedance connected in series with said other primary winding and so proportioned relatively to the impedance of one of the pilot circuit conductors and the ratio of the turns in said primary windings that the flux due thereto normally is substantially zero.

6. In a protective system for an alternating current circuit wherein two current transformers have their primary windings in said circuit at separate points thereof and their secondary windings connected in a pilot circuit normally to produce a circulating current, two auxiliary transformers respectively associated with said current transformers, each comprising two primary windings, one connected in series in the pilot circuit and the other across the secondary winding of the associated current transformer, said primary windings being arranged normally to produce substantially equal opposing magnetomotive forces, and means for compensating for the potential drop in the pilot circuit conductors whereby normally to maintain the equality of said magnetomotive forces comprising an impedance substantially equivalent to the impedance of one of the pilot circuit conductors connected in series with said other operating winding.

7. In a protective system for an alternating current circuit wherein two current transformers have their primary windings in said circuit at separate points thereof and their secondary windings connected in a pilot circuit normally to produce a circulating current, two biasing transformers respectively associated with said current transformers each comprising two primary windings, one connected in series in the pilot circuit and the other across the secondary winding of the associated current transformer, said primary windings being arranged normally to produce substantially equal opposing magnetomotive forces, and means for diminishing the effect on said primary windings due to differences between the characteristics of said current transformers comprising a restraining winding connected in series in the pilot circuit and so disposed as to produce substantially no electromotive force at the terminals of said primary windings but adapted to regulate the fluxes produced thereby in accordance with the current in the pilot circuit and means for compensating for the potential drop in the pilot circuit conductors whereby normally to maintain the equality of said magnetomotive forces comprising an impendance substantially equivalent to the impedance of one of the pilot circuit conductors connected in series with said other primary winding.

In witness whereof, I have hereunto set my hand this 28th day of November, 1924.

ALAN STEWART FITZ GERALD.